March 30, 1943. T. W. COLLIER 2,315,245
PROTECTIVE DEVICE
Filed April 15, 1942 3 Sheets-Sheet 1
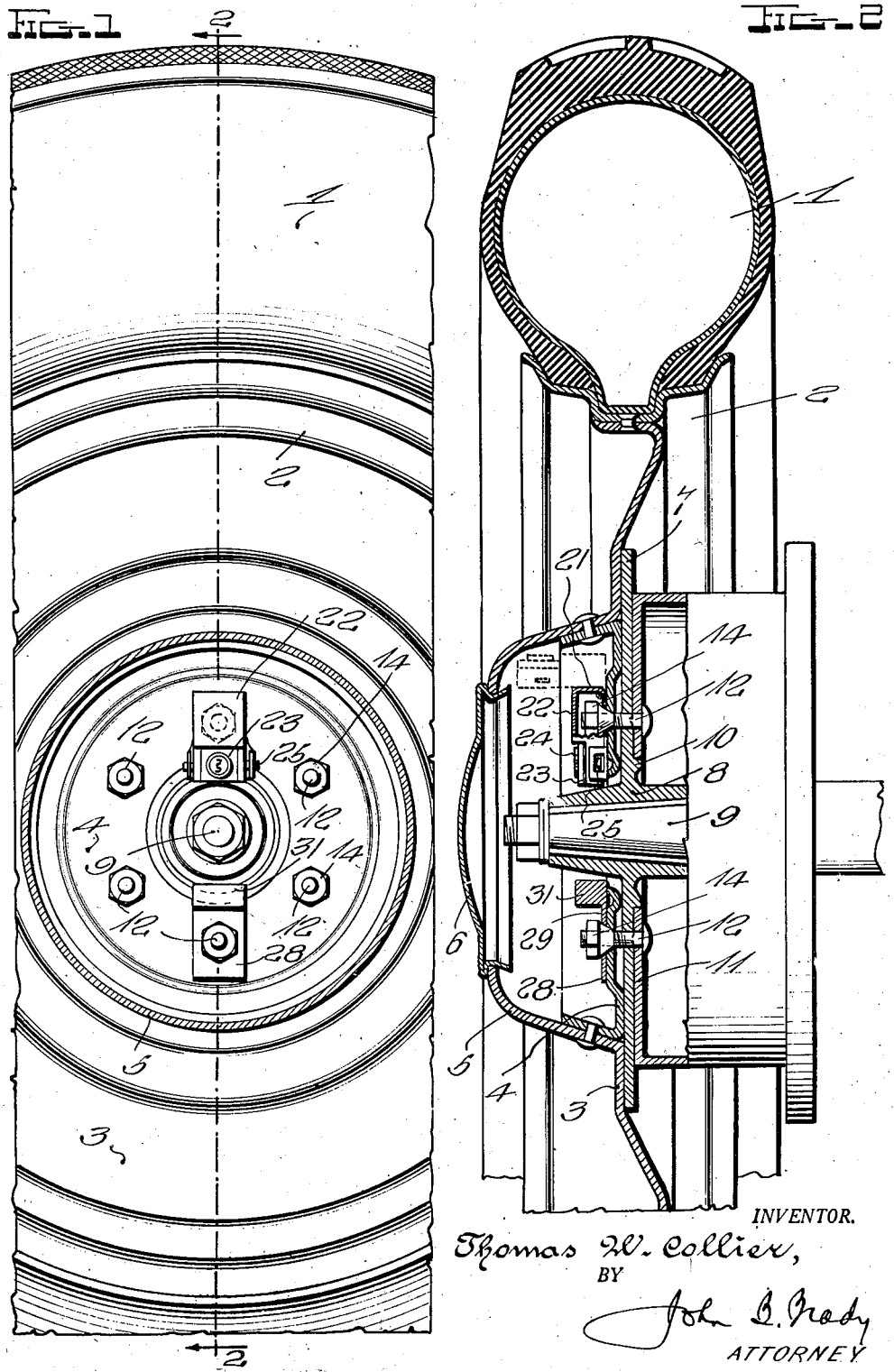
INVENTOR.
Thomas W. Collier,
BY
John B. Brady
ATTORNEY

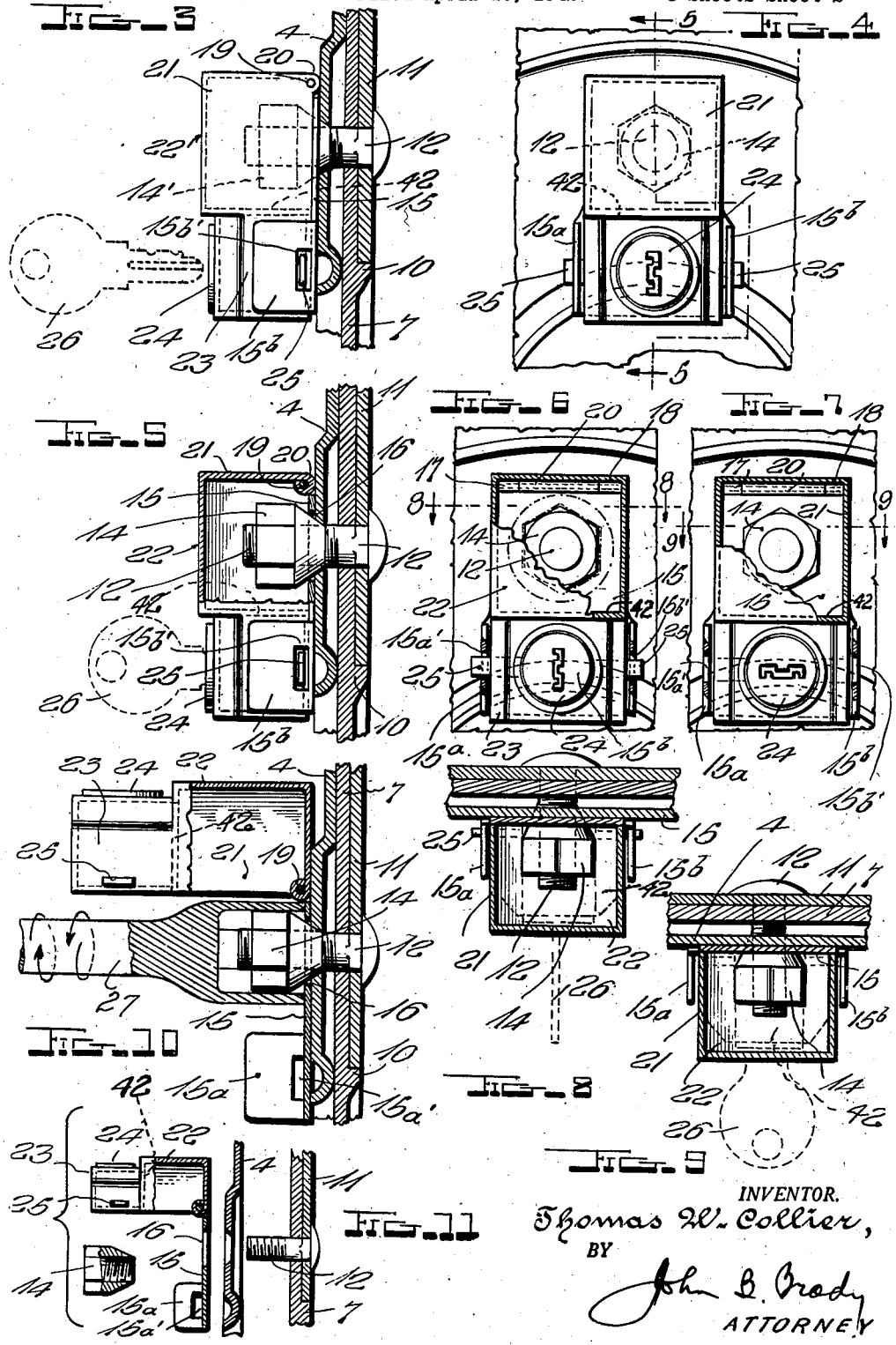

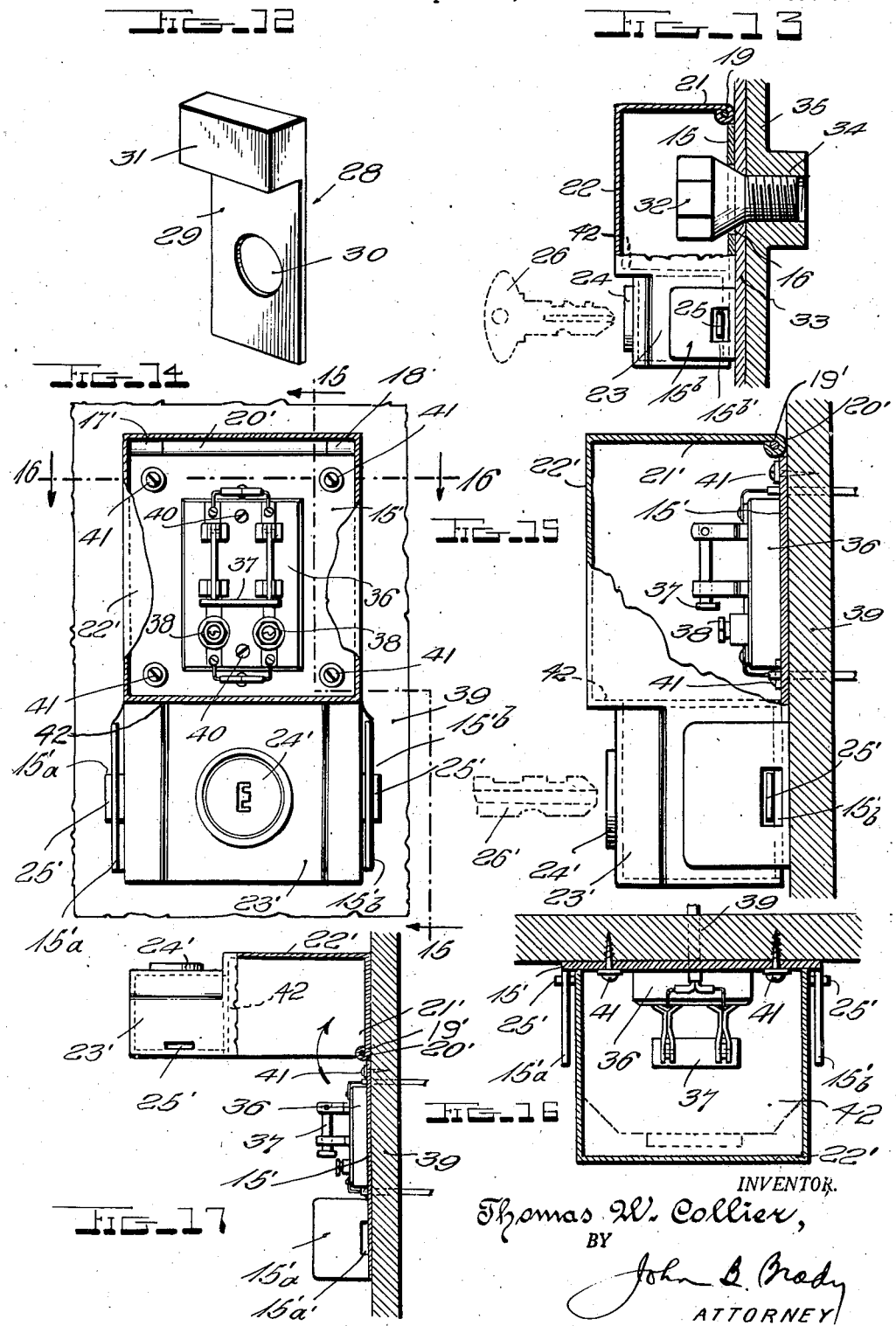

Patented Mar. 30, 1943

2,315,245

UNITED STATES PATENT OFFICE 2,315,245

PROTECTIVE DEVICE

Thomas W. Collier, Brunswick, Ga.

Application April 15, 1942, Serial No. 439,132

1 Claim. (Cl. 70—232)

My invention relates broadly to protective devices and more particularly to protective means for avoiding theft of bolt or nut locked articles.

One of the objects of my invention is to provide a device readily attachable to standard bolts and nuts for locking such bolts and nuts against removal for thereby preventing theft of any articles or devices secured by such bolts or nuts.

Another object of my invention is to provide a construction of readily marketable locking attachment for bolts or nuts which may be attached to standard bolts or nuts to prevent tampering therewith or removal thereof unless the device is unlocked with a key individual to the attachment.

Still another object of my invention is to provide a hinged device attachable to a standard bolt head or nut for wholly enclosing the bolt head or nut and preventing removal thereof, with means for locking the hinged parts securely in position against unauthorized access to the bolt head or nut.

A further object of my invention is to provide a construction of hinged locking device arranged to enclose a standard bolt head, nut, or other article where the locking device includes a base plate having projecting lugs coacting with the hingedly connected locking device with a bolt member carried by the hinged locking device and engageable with the lugs for maintaining said hinged locking device in locked position for enclosing the bolt head, nut or other article against unauthorized access.

A still further object of my invention is to provide a construction of protective device comprising the hinged cover member attachable over the device to be protected with means for locking the hinged cover device in a position to wholly enclose the device to be protected.

Another object of my invention is to provide a construction of protective device applicable particularly to bolt attached vehicle wheels having means attachable to one of the securing bolts for locking the securing bolt against removal and means attachable to a diametrically opposite securing bolt for compensating for the added mass of the locking device and maintaining the equilibrium of the wheel during normal operation thereof.

Other and further objects of my invention reside in a construction of protective device of general application as set forth more fully in the specification hereinafter following by reference to the accompanying drawings, in which:

Figure 1 is an elevational view of an automobile wheel illustrating the protective device and compensating weight applied thereto in accordance with my invention; Fig. 2 is a vertical sectional view taken on line 2—2 of Fig. 1; Fig. 3 is a side elevational view of the protective device of my invention in locked position over a securing nut employed for maintaining a vehicle wheel in position; Fig. 4 is a front elevational view of the protective device illustrated in Fig. 3; Fig. 5 is a sectional view taken on line 5—5 of Fig. 4 with parts of the device illustrated in side elevation; Fig. 6 is a front elevational view of the protective device of my invention shown in locked position with parts thereof broken away to show the interior thereof; Fig. 7 is a view similar to the view shown in Fig. 6 but illustrating the protective device in unlocked position preparatory to being swung to open position for access to the securing nut; Fig. 8 is a transverse sectional view taken on line 8—8 of Fig. 6; Fig. 9 is a transverse sectional view taken on line 9—9 of Fig. 7; Fig. 10 illustrates the protective device in open position whereby a socket wrench may be used for tightening or removing the securing nut; Fig. 11 is a view showing the manner in which the parts of the protective device are assembled with respect to the securing bolt or nut; Fig. 12 is a perspective view of the compensating weight employed in the protective system as applied to automobile wheels to avoid any unbalanced condition in operation of the automobile wheel; Fig. 13 is a side elevational view of the protective device partially broken away and shown in section where the protective device serves to cover the head of a bolt as distinguished from a nut illustrated in Figs. 1–11; Fig. 14 is a front elevational view showing a modified form of protective device of my invention as applied to the protection of articles generally and in the instance illustrated an electrical switch; Fig. 15 is a side elevational view of the protective device shown in Fig. 14 partially broken away to show the article therein which is enclosed by the protective device in locked position; Fig. 16 is a transverse sectional view taken on line 16—16 of Fig. 14; and Fig. 17 is a view of the protective device after being unlocked and moved to a position uncovering the article intended to be protected.

My invention is directed generally to the protection of articles by enclosure of such articles within a casing which is locked against unauthorized access. The device of my invention may be readily applied to standard nuts and/or bolts and it is unnecessary to employ nuts or bolts of special construction merely for the purpose of protection afforded by the device of my invention. The protective device of my invention is applicable to the protection of vehicle wheels and spare tires generally. My invention also has application to the enclosure and locking of articles generally such as electric switches, valves, control devices, levers, and other mechanisms where tampering by the public generally is to be prevented and unauthorized access to the device had only by key operative in a key lock.

Referring to the drawings in detail, reference character 1 indicates generally an automobile tire carried by a rim structure 2 supported by a disc type wheel structure 3 having an annular central securing portion 4. The central securing portion 4 is riveted in the usual manner to the hub portion 5 which is adapted to be closed by removable hub cap 6. The structure of the wheel is completed in the usual manner by means of vertical mounting plate 7 extending from hub 8 through which axle 9 extends. The vertically disposed mounting plate 7 has an annular flange 10 thereon upon which the brake-drum housing 11 is fitted. The usual securing bolts 12 pass through the side wall of the brake-drum housing 11 and through the vertically disposed supporting plate 7 and through aligned apertures in the central securing portion 4. In the arrangement illustrated in Figs. 1 through 11 the threaded ends of the bolts 12 project through the apertures in the central securing portion 4 for receiving the securing nuts 14.

The protective system of my invention is applied to the securing bolts in diametrically opposite positions. The protective system comprises two parts, that is, the locking device applicable to one of the securing bolts and a compensating weight applicable to a diametrically oppositely disposed securing bolt. The locking device comprises a base plate portion 15 having a pair of side lug portions 15a and 15b positioned adjacent one end thereof and projecting normal thereto. The base plate 15 is apertured for the passage of a securing bolt as represented at 16 to enable the base plate to be readily slipped over the projecting end of the securing bolt. One end of the base plate 15 is provided with a pair of rolled-over portions 17 and 18 for receiving a pin 19 which passes through a coacting rolled-over portion 20 in the edge of the cover member 21. The pin 19 thus serves as a hinge about which the cover member 21 is adapted to pivot for movement of the protective device from the locked position illustrated in Figs. 3–6 to the unlocked position illustrated in Figs. 10 and 11.

The cover member 21 includes a covering portion 22 adjacent the hinged end and a lock carrying portion 23 adjacent the remote end of the cover member, said covering portion being separated from the lock carrying portion by a partition indicated at 42. The lock carrying portion 23 provides a support for a key actuated lock 24 which is mounted between the side walls of the hingedly movable cover member 21. The lock including a double bolt structure indicated at 25 adapted to be projected simultaneously in opposite directions as the key 26 is turned in the key lock 24. The double throw bolts 25 project through slots 15a' and 15b' in the lugs 15a and 15b, respectively, attached to the base plate 15 when the locking bolts 25 are aligned with the slots 15a' and 15b'. The double throw bolts 25 operate simultaneously under control of key actuated lock 24 to project the locking bolts 25 in opposite directions to engage the slots 15a' and 15b' in the side members 15a and 15b to positions extending substantially beyond the limits of the side members as illustrated. When the cover device is moved to a position wholly enclosing the securing nut 14 the key 26 is inserted in the key actuated lock 24 and the locking bolts 25 projected to the position shown in Fig. 6 thus locking the securing bolt 14 against access. When however the key 26 is inserted in the key lock 24 and moved to the position illustrated in Fig. 7, the locking bolts 25 are retracted so that the cover device 21 is free to be moved outwardly about pin 19 as a hinge in the position illustrated in Fig. 10. A socket wrench or other suitable tool 27 can now be inserted over the nut 14 for rotation either to secure the nut in position or remove the nut for changing the tire.

Thus it will be seen that the assembly of the protective device with respect to an automobile wheel or spare tire may be effected very simply and quickly by first removing the nut 14 from the projecting end of the bolt 12, passing the apertured plate 15 over the projecting end of the bolt 12 with the cover device in open position with respect thereto, screwing on the nut 14 as represented in Fig. 10 by means of a socket wrench or other suitable tool, and then closing and locking the cover device 21. When the cover device 21 is moved to closed position about pin 19 as a pivot the lock carrying portion 23 of the cover device fits between the lugs 15a and 15b of the base plate 15 so that the projectible and retractible bolts 25 may register with the apertures 15a' and 15b' permitting these bolts to be projected through the apertures in the lugs for thus maintaining the cover device in position. When it is desired to remove the tire in an authorized manner the key 26 is inserted in the lock 24, the bolts 25 retracted, leaving the cover device free to be moved outwardly to the position shown in Fig. 10 whereupon the socket wrench may be engaged over the nut 14 for thus removing the nut and removing the tire.

In order to compensate for the added mass of the locking device to avoid unbalancing of the vehicle wheel while in operation, I provide a member 28 illustrated in Fig. 12 which includes a flat plate 29 apertured at 30 for the passage of the securing bolt 12 which is diametrically opposite that securing bolt to which the lock is applied and also including a weight 31. The device 28 may be cast or may be machined from a suitable plate material. It will be noted that both the locking device and the compensating device are eccentric to the axis of the securing bolt so that the two masses compensate each other and prevent any unbalance in the operation of the wheel.

In Fig. 13 I have shown the locking device of my invention applied as a protective means for a bolt head 32 as distinguished from a nut of the kind represented at 14 in Figs. 1–11. The bolt having bolt head 32 extends through aperture 16, base plate 15 and through an aligned aperture in plate 33 entering the screw threaded bore 34 in plate 35. The arrangement of the hinged cover of the protective device is similar to the arrangement illustrated in Figs. 1–11. The protective device of my invention is thus applicable either to preclude the removal of a nut from a screw threaded bolt or to prevent the removal of a headed bolt.

Similarly the protective device of my invention may be modified to protect articles or devices of various descriptions as hereinbefore pointed out.

In Figs. 14-17 I have shown a modified form of protective device of enlarged structure serving as a protective cover to prevent tampering with the electric switch shown at 36. The electric switch 36 comprises a base, carrying knife switch 37 equipped with fuses indicated at 38. The base is secured to a suitable support indicated at 39 by suitable means such as screws 40 which pass through apertures in the base plate designated at 15' and into the structure of the support 39. The base 15' is apertured for the passage of securing screws 41 therethrough which extend into the structure of the support 39. The electric switch which is mounted upon plate 15' has been selected as illustrative of any article or device to be protected and it will be understood that this may be a valve, a control lever or mechanism of any kind. The structure of the protective device is similar to the structure described in connection with Figs. 1-11 except that the protective device is fabricated upon an enlarged scale. Accordingly I have indicated corresponding parts by corresponding reference characters which have been primed in designating the parts in Figs. 14-17. That is to say, the base 15' carries rolled edge portions 17' and 18' which are aligned with the rolled edge 20' of the hinged cover 21'. The pin 19' extends through the rolled edge 20' of hinged cover 21' for allowing the hinged cover to be moved from the positions illustrated in Figs. 14 and 15 to the position shown in Fig. 17. The hinged cover includes the protecting portion 22' and the lock carrying portion 23'. The lock is represented at 24' for actuating the double thrust bolt 25' under control of key 26'. The double thrust bolt 25' is projectible in opposite directions for engagement through apertures 15'a' and 15'b' in the upwardly projecting lugs 15'a and 15'b. Thus it will be seen that the electrical switch, hand valve, etc., can be moved to the desired position with the protective device open as represented in Fig. 17 and remain in that position with the protective device closed as illustrated in Figs. 14 and 15. The key 26' is utilized to lock the protective device in the position shown in Figs. 15 and 16. Any authorized individual such as a watchman, policeman or caretaker possessing a key may unlock the protective device cover and move the same to open position for manipulating the article or device enclosed therein.

While I have described my invention in certain preferred embodiments I realize that modifications may be made in the structure of the device of my invention and I intend no limitations upon my invention other than may be imposed by the scope of the appended claim.

What I claim as new and desire to secure by Letters Patent of the United States is as follows:

A locking device comprising a mounting plate secured adjacent a device to be protected, a casing hingedly connected at one end with said mounting plate in a position substantially displaced from the device to be protected and comprising a covering portion and a lock carrying portion separated by a partition member, said covering portion being adapted to cover the device to be protected and be moved to a position in which said casing projects substantially normal to the plane of said mounting plate and one wall thereof extends substantially continuous with said mounting plate, side members integrally connected with said mounting plate and having diametrically opposite slots therein adjacent said plate, and a lock mounted in the lock carrying portion of said casing and having symmetrically disposed projectible and retractible double throw locking bolts adapted to engage the diametrically opposite slots in said side members for maintaining said casing in position over said mounting plate, said casing being movable with respect to said mounting plate for allowing unobstructed access to the device to be protected when said double throw locking bolts are disengaged from the slots in said side members.

THOMAS W. COLLIER.